Nov. 11, 1969  LE ROY E. DALBERG ETAL  3,477,649
SOLID WASTE RECLAIMING METHOD AND SYSTEM
Filed Sept. 26, 1967  5 Sheets-Sheet 1

INVENTOR.
HERBERT DALBERG
LEROY E. DALBERG
BY
ATTORNEYS

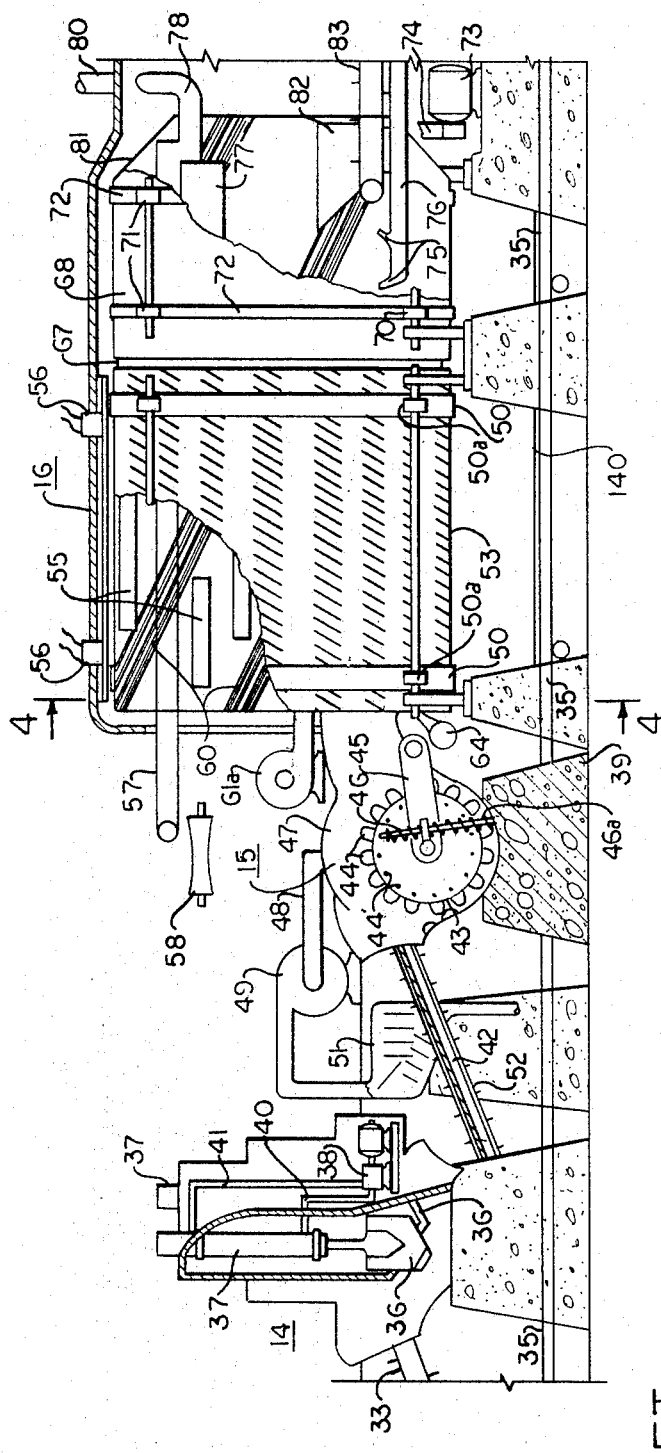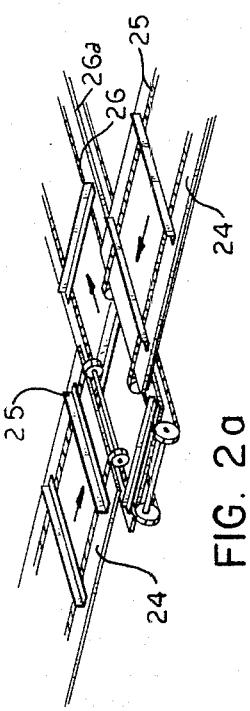

Nov. 11, 1969   LE ROY E. DALBERG ETAL   3,477,649
SOLID WASTE RECLAIMING METHOD AND SYSTEM
Filed Sept. 26, 1967   5 Sheets-Sheet 3

INVENTOR.
HERBERT DALBERG
LEROY E. DALBERG
BY
ATTORNEYS

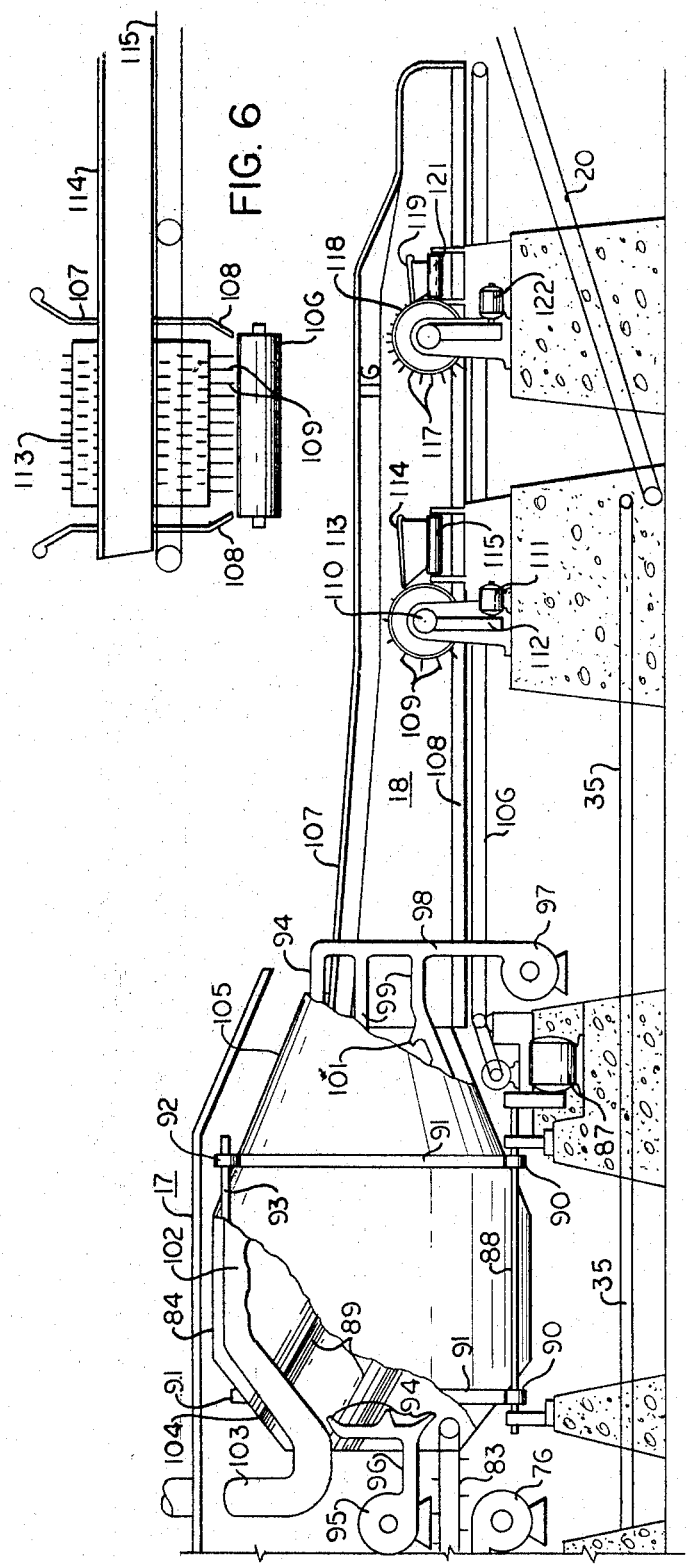

Nov. 11, 1969　　LE ROY E. DALBERG ETAL　　3,477,649
SOLID WASTE RECLAIMING METHOD AND SYSTEM
Filed Sept. 26, 1967　　　　　　　　　　　　　　5 Sheets-Sheet 5

INVENTOR.
**HERBERT DALBERG
LEROY E. DALBERG**
BY *McGrew & Edwards*
ATTORNEYS

United States Patent Office 3,477,649
Patented Nov. 11, 1969

3,477,649
SOLID WASTE RECLAIMING METHOD AND SYSTEM
Le Roy E. Dalberg, 13005 W. 72nd Ave., and Herbert Dalberg, 12925 W. 72nd Ave., both of Arvada, Colo. 80002
Filed Sept. 26, 1967, Ser. No. 670,602
Int. Cl. B02c 17/02; B07b 13/00; B03c 1/00
U.S. Cl. 241—24
8 Claims

ABSTRACT OF THE DISCLOSURE

A system for reclaiming useful materials from solid waste comprises a feed hopper which supplies the waste to a series of treating devices. The waste is first sized and then beaten to separate unlike materials; the mass of waste is then passed through apparatus for separating and removing in order magnetic material, film plastic, paper, rubber and rags. The remaining waste material is then supplied to a ball mill or the like for reduction to fine size to provide a fine ground material which can readily be treated for the separating and collecting of its individual components.

---

This invention relates to the reclaiming of usable materials from solid waste and particularly to an improved method and apparatus for rendering usable all components of large masses of solid waste.

The collection and disposal of solid waste in metropolitan areas have given rise to tremendous problems. The disposal methods generally practiced today include incineration, burying in land fill areas, composting and generally discarding or dumping. The term "solid waste" as used herein has been defined in the United States Department of Public Health and Welfare Pamphlet Title II, Public Law 89–272, 89th Congress, S. 306, Oct. 20, 1965, as meaning "garbage, refuse, and other discarded materials, including solid-waste materials resulting from industrial, commercial, and agricultural operations, and from community activities, but does not include solids or dissolved material in domestic sewage or other significant pollutants in water resources, such as silt, dissolved or suspended solids in industrial waste water effluents, dissolved materials in irrigation return flows or other common water pollutants."

The present methods of solid waste disposal present increasingly more difficult problems as air and water pollution laws are enforced and as suitable land areas become more scarce. Furthermore, the transportation of the solid waste to the disposal areas becomes more and more costly. Accordingly it is an object of this invention to provide an improved method and system for disposing of solid waste.

It is another object of this invention to provide a system of solid waste disposal which makes possible the reclaiming of usable materials from solid waste.

It is a further object of this invention to provide an improved method for reclaiming usable materials from solid waste and for facilitating the transportation of solid waste to the reclaiming site.

Briefly, in carrying out the objects of this invention in one embodiment thereof, a reclaiming plant is provided which comprises a hopper for receiving solid waste from compaction type waste collection trucks, a conveyor for supplying the material to a shearing machine for reduction to a predetermined maximum size; then to a hammer mill and then to tumbling drums where magnetic materials, plastic film, and paper are successively removed and collected separately, then to apparatus for removing and collecting rubber and rags successively and finally to a ball mill where all remaining material is reduced to fines suitable for shipment to separation plants. In addition fines are removed at each operating stage and are bypassed by a conveyor directly to the ball mill.

The features of novelty which characterize this invention are pointed out with particularity in the claims annexed to and forming a part of this specification. The invention itself, however, both as to its organization and method operation, together with further objects and advantages thereof, will be better understood upon reference to the following description taken in connection with the accompanying drawings in which:

FIG. 2a is a somewhat diagrammatic perspective view of the scraper bar conveyor system for the hopper of FIG. 2;

FIG. 3 is an enlarged side elevation view, partly in section and partly broken away, of the waste size reducing section and the ferrous material and film plastic removal components of the apparatus of FIG. 1;

FIG. 5 is an elevation view, partly in section and partly broken away, showing the paper removal drum and the rubber and rag removing components of the apparatus of FIG. 1;

FIG. 6 is an enlarged rear elevation view of the rubber removing components of the system;

Figure 1:
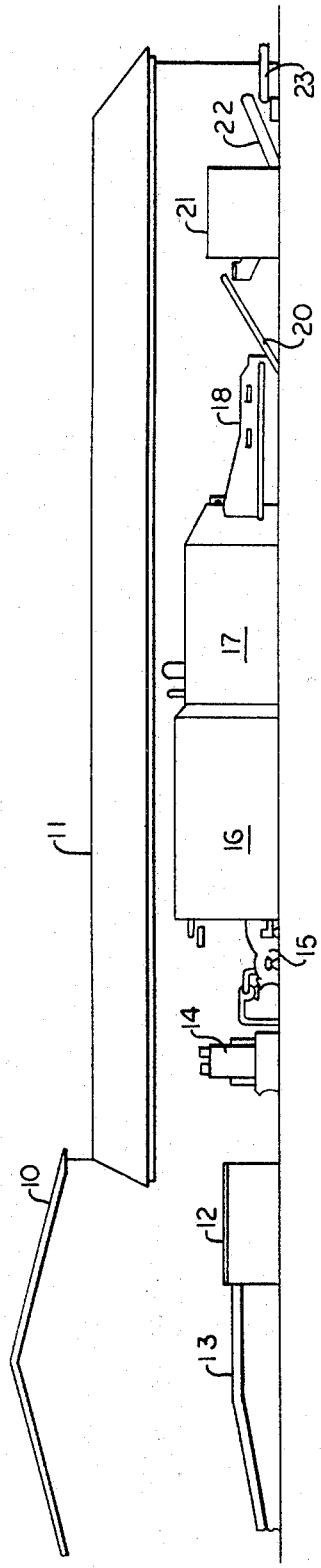
FIG. 1 is a diagrammatic elevation view of a solid waste disposal system embodying the invention.

Referring now to the drawings, the system of FIG. 1 is illustrated as housed within a building comprising a high roofed portion 10 on the left and a long lower roof portion 11 covering the operating components of the system. The building is constructed to completely enclose the system and to minimize the noise and dust transmitted to the outside. The high shed portion 10 is at the entrance to the system and houses a hopper 12 constructed of reinforced concrete and provided with a ramp 13 by which compaction type trucks may approach the hopper for unloading. From the hopper the material is transferred to a hydraulically actuated shearing machine 14 where the larger components of the waste such as refrigerators, washing machines and other appliances are reduced to a predetermined maximum size. From the shearing machine 14 the material is transferred to a hammer mill 15 which further reduces the size of the larger components of the waste and also separates unlike materials from one another, for example metal from adhering plaster or plastic materials. From the hammer mill 15 the waste material passes to the inlet of a rotary separator or drum 16, the first or left-hand portion of which is arranged to remove ferrous materials from the waste passing through the drum and the second or right-hand portion of which is arranged to remove film plastics. From the drum 16 the material passes to a unit 17 which is a rotary drum constructed and operated to remove paper and the like from the waste passing therethrough. In each of the stages of the units or drums 16 and 17, the removed material is carried out from the drums by suitable conveyors and collected for shipment. The material leaving unit 17 passes through a housing shielded conveyor unit 18 in which are arranged two combing drums for removing rubber material and rags successively in order as the waste passes through the unit 18. From the unit 18, the remaining material is carried by conveyor 20 to a grinding mill 21 which may be of the ball type such as is used in the mining industry for reducing the size of ore. During the operation of the system, some fine materials are present in each stage and these are collected in a manner described below and carried to the conveyor 20 so that they are supplied to the ball mill with the output of the unit 13. The final product is carried on an inclined conveyor 22 to a collection conveyor 23 which carries the fine material away from the system for collection and shipment.

The system as illustrated makes it possible to separate and restore for reuse in industry, materials which at the present time are commonly consumed, buried or composted, or discarded in dumping areas. The system during operation is arranged to extract respective like materials of solid waste at the several stages and thus classifies the materials such as metals, plastic, paper, organic matter, rubber and solid chemical compositions so that they may be collected and distributed for reuse.

The construction and operation of the solid waste disposal system is illustrated in further detail in the remaining figures of the drawings.

Figure 2:
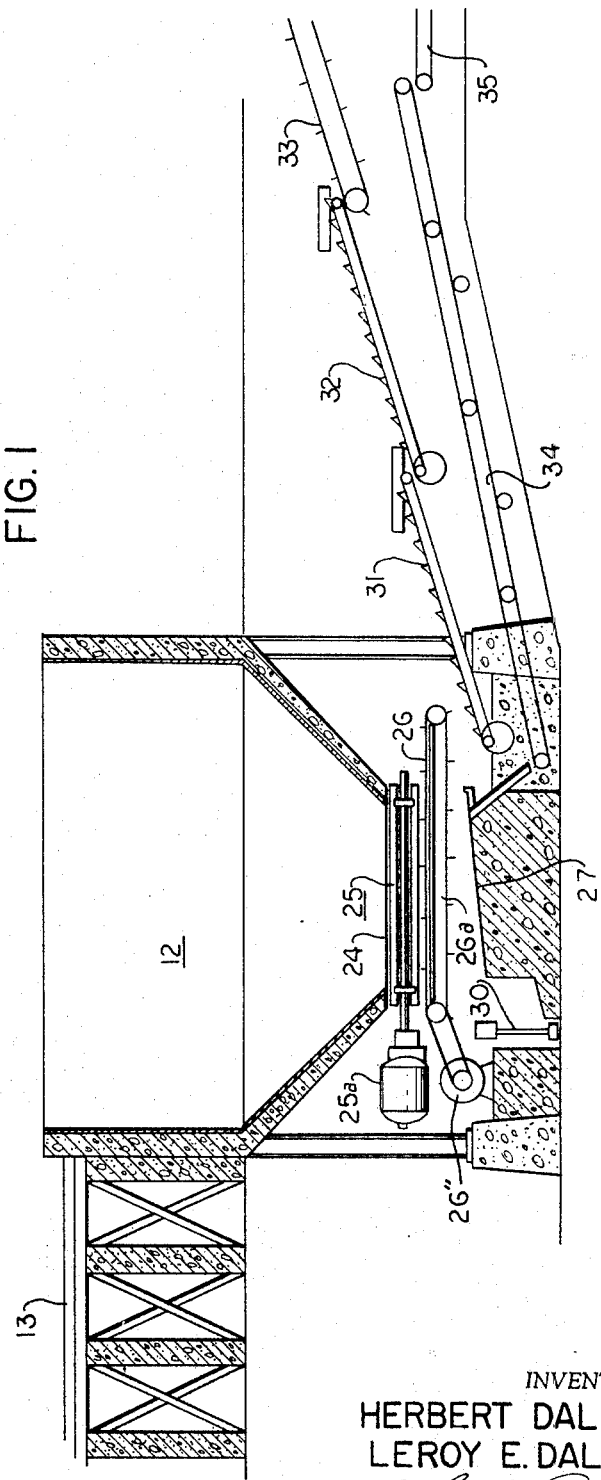
FIG. 2 is an enlarged view partly in section of the solid waste receiving hopper of the system of FIG. 1.
Figure 3A:
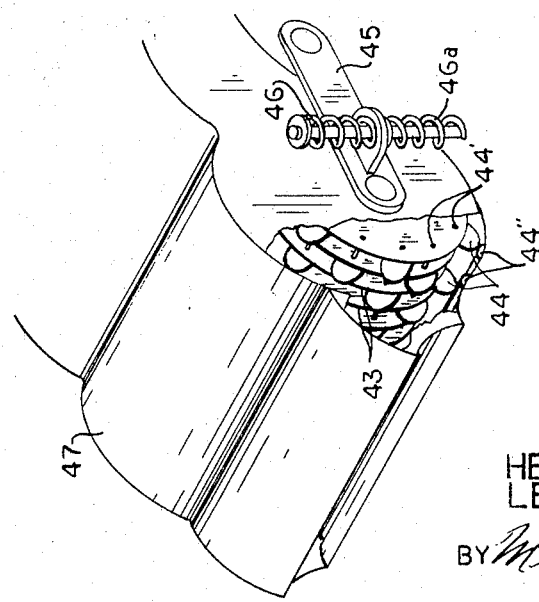
FIG. 3a is a perspective view, partly broken away of the hammer mill of FIG. 3.

FIG. 2 illustrates the hopper 12 in section. The pit is constructed of concrete lined with steel to prevent corrosion and chipping of the concrete and to prevent bacteria growth on the face of the pit or hopper. The walls of the pit slope inwardly and terminate adjacent downwardly sloping walls 24 on either side of the center thereof. These base walls 24 are constructed of concrete with a steel facing and, as shown in FIG. 2a, a chain bar or scraper conveyor 25 driven by an electric motor 25a is provided on each side of the center opening to maintain an even flow of waste over the base of the feeder pit onto a similar conveyor 26. The conveyor 26 is positioned below the central opening and is driven by an electric motor 26" to move at right angles to the conveyor 25 to force the material over a central bottom plate 26a. Any liquids in the waste are drained from the hopper and flow over a sloping surface 27 below the openings of the base and thence into a pit 28 from which they are removed by operation of a sump pump 30. The conveyor 26 runs horizontally along at plate 26a and moves the solid waste away from the feeder pit onto an inclined shaker platform 31 thence to a second shaker platform 32 for conveying the waste to a cross bar conveyor 33. During the operation of the portion of the system illustrated, fine materials drop from the moving waste and fall onto a fine material collecting conveyor 34. Conveyor 34 carries the fine materials upwardly and deposits them on a horizontal conveyor 35 which constitutes a continuation of the conveyor 34 and is located centrally of and below all the operating components of the system between the hopper and the ball mill 21. The conveyor 33 moves the solid waste upwardly and deposits it in the shearing machine 14. This machine is provided with a plurality of shearing blades or guillotines 36 which are driven hydraulically by plungers arranged in cylinders 37. The hydraulic plungers are actuated by hydraulic fluid supplies from an electric motor driven pump 38 through lines 40 and 41 by suitable controls (not shown) which alternately supply the fluid to opposite sides of the pistons within the cylinders 37. The waste material, the larger parts which have now been reduced to a maximum permissible size, are carried by a scraper bar conveyor 42 upwardly into the hammer mill 15. The mill is diagrammatically illustrated in FIGS. 3 and 3a as a heavy roller comprising a plurality of spaced discs 43 having therebetween a multiplicity of hammer bars 44 pivoted on rods 44' which pass through the discs. The roller is rotatably mounted on side bars 45 the spacing between the rotor and the housing of the grinder being adjustable by means of tension springs 46 and 46a. The rotor 43 is mounted within a closed housing indicated at 47 which has two or more solid cross ridges 47' adjacent and below the inlet. The bars 44 hammer the entering waste against the ridges. Large amounts of dust may be produced during the beating operation.

The bottom wall of the housing 47 is bedded on a reinforced concrete block 39 which provides the solid foundation against which the hammers operate. This dust is removed from the upper portion of the housing 47 through a conduit 48 by operation of a suction blower 49 which delivers the dust to a baffle chamber 51 where it is separated from the air stream and delivered downwardly through a duct 52 which carries it to the conveyor 35.

The beating of the waste material in the hammer mill 15 not only reduces the size of the waste material but hammers or beats each component of the material so that those components comprising different materials have those materials separated from one another during passage through the hammer mill. The beaten material is delivered through the outlet of the mill 15 to a drum 53 in the left-hand portion of the unit 16 and is tumbled within the unit as it passes toward the right end thereof. Drum 53 comprises a cylindrical shell having external drive rings 50 nearer its ends and is mounted for rotation drive rollers 50a having shafts 50b driven by a motor (not shown). Stabilizing rollers 50c engage the rings 50 at the upper side of the drum. The drum 53 has a multiplicity of slits or perforations 54 extending through its walls. These perforations allow the fines in the material delivered by the hammer mill 15 to pass through the walls of the drum and onto the conveyor 35. On the inner walls of the drum there are mounted a plurality of magnetizable bars 55 which are constructed as electromagnets energized through controls 56. Ferrous materials tumbled in the drum adhere to the magnets and move upwardly to the top of the drum where the electric circuits are broken momentarily so that the ferrous materials fall from the magnets 55 onto a conveyor 57 by which they are removed from the drum through the open end thereof and are carried to a cross conveyor 58 for removal and collection. The arrangement and manner of operation of the magnetic separator will be readily understood by those skilled in the art and the details of construction have not been illustrated as they are not essential to an understanding of the present invention.

Movement of the waste materials through the drum 53 is facilitated by pitched baffles 60, a plurality of which extend the length of the drum 53 and are inclined or pitched at an angle to urge the materials forward through the drum. In the upper portion of the drum adjacent the magnetic cutoff zone where ferrous materials are released to fall on the conveyor 57, there is arranged an air supply manifold 61 having nozzles 62 for projecting jets of air over the magnetic material adhering to the magnets 55 as they approach the cutoff zone and nozzles 63 arranged to produce jets of air over the conveyor to remove light weight debris from the magnetic materials as they fall toward the conveyor. The manifold 61 is supplied with air from a blower 61a mounted near the open front of the drum.

Figure 4:
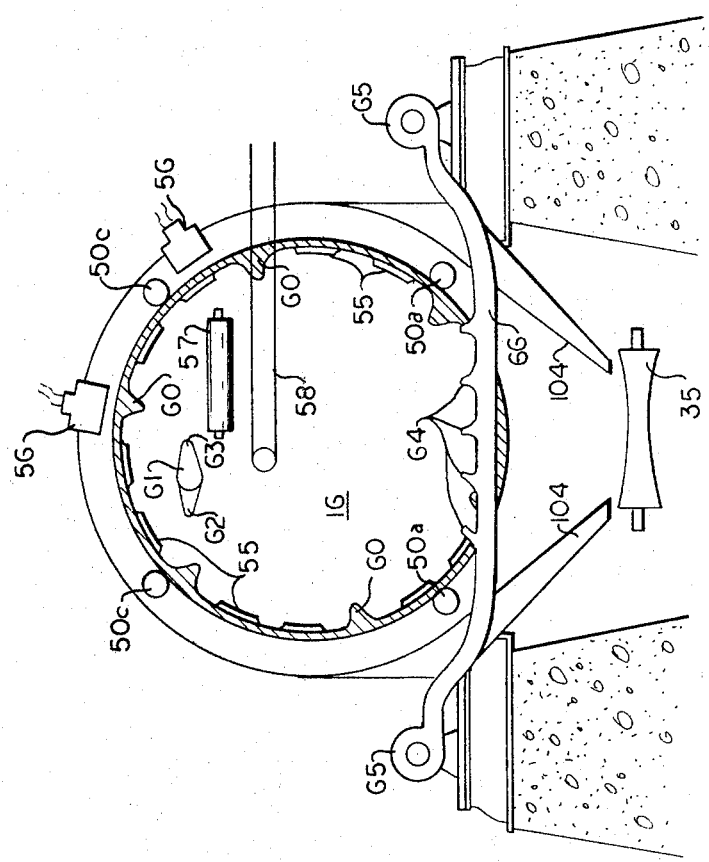
FIG. 4 is a sectional view taken along the line 4—4 of FIG. 3.

In addition to the upper air nozzles a plurality of air nozzles 64 are directed into the entrance of the drum as shown in FIG. 4; these nozzles are supplied with air from oppositely directed blowers 65 and manifold or conduit 66. The jets of air produced by the nozzles 64 keep the lighter materials moving through the drum and minimize the loss of materials at the entrance to the drum.

The drum 53 is provided with an annular flange indicated at 67 which projects a short distance into the mouth of a second drum 68 which is provided for removing film plastics and the like from the waste material passing therethrough. The drum 68 is mounted on lower rollers arranged in sets of two on either side of the drum, one of the rollers being shown at 70. Complementary sets of rollers 71 are provided at the top of the drum on the side and stabilize the drum for rotation. The rolls contact an annular roller strap or band 72 and one of the lower sets of rollers is driven by a motor 73 through a belt 74 to drive the drum, the drive connections not being fully shown in the drawing. As the waste is tumbled in the drum 68, light materials such as film plastic are separated from the mass by operation of air jets 75 supplied from a suitable blower source through a manifold or conduit 76. The light material tends to separate by gravity as the waste is tumbled in the drum and separation is further facilitated by providing an electrostatic field of charged plates 77 which tend to collect the film plastic and bring it within range of a vacuum system 78 which operates continuously to draw air and the film plastic materials out through a duct 80. The drum tapers toward its right-hand end as indicated at 81 and materials tumbled in the drum as they move toward the right-hand end fall into a hopper 82 which directs the material onto a conveyor 83 thereby discharging it from the drum.

The conveyor 82 carries the material into the paper separating unit 17 which is provided with a solid walled rotating drum 84 having an open left-hand end through which the carrier 83 extends to discharge the materials into the drum 84. The drum 84 is mounted in a manner similar to the drums 53 and 68. It is driven by a motor 87 through a shaft 88 which drives lower rollers 90 engaging annular rings 91 which are also engaged by stabilizing rollers 92 at the upper end of the drum, one of these rollers being indicated in FIG. 5 as mounted on a shaft 93. Air is discharged continuously into the drum 84 from forward jets 94 supplied with air from blower 95 through a duct 96 and rearwardly directed jets supplied from a blower 97 through a manifold 98 and cross manifolds 99 which project through the open left-hand end of the drum and discharge air from nozzles directed angularly into the drum, one of which is shown at 101. The tumbling of the waste material aided by means of baffles 89, in the drum 84 with the continuous application of air streams or jets from the nozzles causes the light materials such as paper to be suspended in the drum where they are readily withdrawn through a vacuum manifold 102 connection to a suitable vacuum system (not shown) through a conduit 103 which extends through the open right-hand end of the drum. Drum 84 is conical in section both at the intake end, indicated at 104, and at the discharge end as indicated at 105. The waste material after removal of the light paper components in the drum is discharged from the right-hand end of the drum onto a conveyor 106 which passes along the open bottom wall of the shielded conveyor unit 18. The unit 18 comprises an elongated open topped housing or shield 107, the shield being provided with inwardly sloping lower wall portions 108 as indicated in FIG. 6. The material moving forward on the conveyor 106 moves into engagement with a combing device comprising a multiplicity of spaced pins or fingers 109 mounted on a shaft 110 driven by a motor 111 through a belt 112. The fingers 109 project through a cylindrical drum or casing 113 which is mounted for rotation eccentrically of the axis 110 in a manner such that the pins 109 lie outside the drum 13 on the forward side of the drum and are retracted on the rearward or right-hand side. Materials such as pieces of rubber tire and the like are picked from the waste moving along the belt 106 by the extending fingers 109 and are carried upwardly and over the drum 113 where they are removed from the receding fingers and fall into a hopper 114. The hopper 114 deposits the separated materials on a belt conveyor 115 which extends laterally of the shielding housing 107 and carries the separated material to the outside of the housing, the walls of the hopper 114 being extended to provide shields or guides for holding the material on the conveyor as it is discharged from the housing. The remaining waste material which has passed under the rubber removing unit is then subjected to a rag removing action by a combing unit 116 having a multiplicity of pins 117 and an eccentric cylinder 118 of construction similar to that of the rubber removing unit but in which there are more of the pins mounted at closer spacing. These pins are effective to pick up materials such as textiles, rags and the like and to deposit them in a hopper 119 similar to the hopper 114 and by means of which the materials are discharged onto a lateral conveyor 121 and removed through the housing by extension of the hopper similar to that of hopper 114. The unit 116 is driven by a motor 122 which rotates the unit continuously during operation of the system. Material passing from the unit 116 on the conveyor 106 is deposited on the upwardly extending conveyor 20 which constitutes an extension of the conveyor 35 which is positioned to discharge materials onto the conveyor 20, the discharge zone is not shown on the drawing; it being understood, however, that the right-hand end of the conveyor 35 extends over the left end of the conveyor 20 so that materials falling from the conveyor 35 drop onto the conveyor 20.

Figure 7:
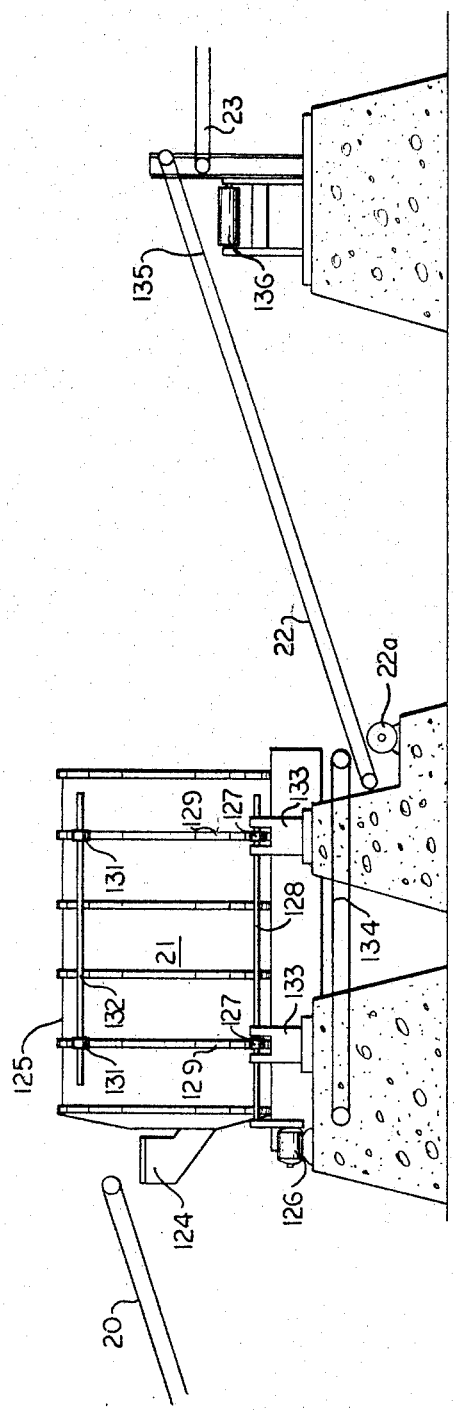
FIG. 7 is an enlarged side elevation view of the fine grinding component of the system.

As shown in FIG. 7 the materials discharged from the right-hand of the conveyor 20 fall into a hopper 124 positioned to discharge the materials into an opening at the left end of a drum 125. Drum 125 is driven by a motor 126 through rollers 127 on a shaft 128, this drive being essentially similar to that of the previously described drums and being effected through annular bearing and drive rings 129. Upper idler or stabilizing wheels 131 mounted on a shaft 132 are provided as in the previously described drums, it being understood that the shafts 128 and 132 are mounted in rigid supports adjacent the drum, these supports for the shaft 128 being shown at 133. The drum 125 constitutes the wall structure of a ball mill which is employed to grind the remaining waste material to a predetermined fine size and to discharge it onto a conveyor 134 which in turn discharges the fine material onto the inclined conveyor 22 driven by a motor 22a through a driving connection (not shown) the conveyor 22 comprises a belt of magnetic material which is magnetized by solenoids (not shown) so that magnetic materials adhere to the belt until they are carried to the underside of the belt indicated at 135 where the electrical magnetizing circuit (not shown) is broken so that the magnetic materials fall onto a cross conveyor 136. The nonmagnetic materials falling from the right end of the conveyor 22 are discharged onto the conveyor 23 to be carried to the collection point for the fine materials other than the ferrous materials separated and discharged on the conveyor 136.

The fines collecting conveyors 34 and 35 are of the shielded conveyor type sloping walls being provided along both sides to direct falling fine materials onto the belts; these sloping walls include the shielding walls 107 of the unit 18 and sloping walls 140 of the drum units 16 and 17. It will be observed that all of the fine materials carried by the conveyor belt 35 and collected from the various operating units of the system are added to the materials discharged from the housing 107 by the conveyor 106 so that all of the fine materials collected throughout the operation and the final product of the operation are both charged into the ball mill 125 by operation of the conveyor 123. The continuous collection of fine materials throughout the system thus makes it unnecessary to handle these materials repeatedly in the successive phases of the system and greatly facilitates the economic operation of the system.

All the final products of the system are collected and sold or otherwise disposed of for reuse. The finely ground materials constituting the final product of the system are carried or shipped to a plant for separation of the various constituents therefrom. Because the entire system is housed within a building constructed to prevent the escape of dust, pollution and bacteria, the system may be operated near or within a community. Thus the system may be installed for servicing by compaction type trucks with a selected area and in large metropolitan areas, several systems may be employed. Each system, for example may be designed and operated at a capacity capable of processing 500 tons of solid waste per day. The quantity of fine materials constituting the final products delivered onto the conveyor 23 may, for example, be about 15% of the total waste material delivered to the system at the hopper 12. The system is arranged so that its operation results in reclaiming and conserving vast quantities of available resources and eliminates the need for allocating land for disposal purposes and further eliminates the use of incineration and resultant smoke product.

While the invention has been described in connection with a specific arrangement and specific components, various modifications and other arrangements will occur to those skilled in the art. Therefore, it is not desired that the invention be limited to the details illustrated and described, and it is intended by the appended claims to cover all modifications which fall within the spirit and scope of the invention.

We claim:

1. The method of reclaiming usable materials from solid waste which comprises:
   reducing the solid bodies in the waste to at least a predetermined size;
   beating the waste to further reduce its size and to separate unlike materials therein from one another;
   magnetically separating and removing and collecting ferrous materials from the beaten mass of waste;
   tumbling the remaining mass of waste and directing jets of air therethrough to separate film plastics and the like therefrom and utilizing a vacuum to remove and collect the film plastics;
   subjecting the then remaining mass of waste to air jets to produce turbulence and separate paper and the like and utilizing a vacuum for removing the paper therefrom and collecting the paper;
   thereafter successively removing rubber materials and rags from the remaining mass of waste; and
   reducing the then remaining material to fine size.

2. The method of reclaiming usable materials from solid waste as set forth in claim 1 including the step of employing static electricity to facilitate the separation of plastic film from the waste during said tumbling step.

3. As in 1 including the step of separating and collecting relatively fine materials at each of a plurality of the steps of the method and adding the collected relatively fine materials to the waste remaining for reduction to fine size.

4. As in 1, including the step of subjecting fine material discharged from the ball mill to a magnetic field to remove fine ferrous materials therefrom.

5. A system for reclaiming usable materials from solid waste comprising in order in a line of treatment stages, hopper means for receiving the waste, means for reducing the larger bodies in the waste to at least a predetermined size, means for beating the waste to further reduce its size and for separating unlike materials from one another, magnetic means for removing ferrous materials from the waste, tumbling means for removing plastic film and the like from the waste, said last mentioned means including vacuum means for removing and collecting the plastic film, means producing turbulence of the waste and utilizing air jets and a vacuum for separating and collecting paper therefrom, means arranged to receive the remaining waste from said last mentioned means for successively separating rubber and fabrics from the waste, and means for grinding to fine size the waste remaining after the separation of rubber and fabrics therefrom.

6. A system for reclaiming usable materials from solid waste as set forth in claim 5 wherein said tumbling means includes electrostatically charged elements for facilitating the removal of plastic film and the like from the waste supplied thereto.

7. A system for reclaiming usable materials from solid waste as set forth in claim 5 including means for collecting relatively fine materials at a plurality of said aforesaid means and for supplying said relatively fine materials to said grinding means.

8. A system for reclaiming usable materials from solid waste as set forth in claim 5 including a second magnetic means for removing ferrous materials from the fine sized material discharged from said grinding means.

References Cited

UNITED STATES PATENTS

| | | | |
|---|---|---|---|
| 455,802 | 7/1891 | Stanley et al. | 241—46 |
| 1,209,654 | 12/1916 | Anderson | 241—46 |
| 1,321,006 | 11/1919 | Brockhausen | 241—46 |
| 2,257,567 | 9/1941 | Matanovich-Manov et al. | 241—46 |
| 2,307,059 | 1/1943 | Moore | 241—46 |
| 3,159,353 | 12/1964 | Atwater | 241—39 |

GERALD A. DOST, Primary Examiner

U.S. Cl. X.R.

241—29, 76